(12) United States Patent
Carroll et al.

(10) Patent No.: US 11,441,578 B1
(45) Date of Patent: Sep. 13, 2022

(54) WATER-POWERED SUMP PUMP

(71) Applicant: ZOELLER PUMP COMPANY, LLC, Louisville, KY (US)

(72) Inventors: Charles P. Carroll, Louisville, KY (US); Daniel C. Masterson, Louisville, KY (US); David R. Gilbert, Charlestown, IN (US)

(73) Assignee: ZOELLER PUMP COMPANY, LLC, Louisville, KY (US)

( * ) Notice: Subject to any disclaimer, the term of this patent is extended or adjusted under 35 U.S.C. 154(b) by 20 days.

(21) Appl. No.: 16/720,505

(22) Filed: Dec. 19, 2019

Related U.S. Application Data

(60) Provisional application No. 62/796,268, filed on Jan. 24, 2019.

(51) Int. Cl.
*F04F 5/10* (2006.01)
*F16L 27/08* (2006.01)
*F16L 37/098* (2006.01)

(52) U.S. Cl.
CPC ............ *F04F 5/10* (2013.01); *F16L 27/0837* (2013.01); *F16L 27/0841* (2013.01); *F16L 37/0985* (2013.01)

(58) Field of Classification Search
CPC .............. F16L 27/0837; F16L 27/0841; F16L 37/0985; F16L 37/133; F16L 37/04; F16L 27/02; F04F 5/10; F04F 5/02
USPC .................................................. 417/196, 197
See application file for complete search history.

(56) References Cited

U.S. PATENT DOCUMENTS

| | | | | |
|---|---|---|---|---|
| 1,230,972 A | * | 6/1917 | Woodworth | F04F 5/48 417/182.5 |
| 1,758,400 A | * | 5/1930 | Jacuzzi | F04D 9/06 222/255 |
| 1,856,537 A | * | 5/1932 | Burks | F04F 5/02 417/54 |
| 1,964,726 A | * | 7/1934 | Engstrand | F04F 5/42 417/54 |
| 3,215,089 A | | 11/1965 | Hoffmann | |

(Continued)

OTHER PUBLICATIONS

"Hi & Dry Backup Sump Pumps" by RadonSeal (2018) https://www.radonseal.com/category/basement-pumps.html.

(Continued)

*Primary Examiner* — Bryan M Lettman
(74) *Attorney, Agent, or Firm* — Scott R. Cox; Jessica C. Ronald; Jeffery P. Langer

(57) ABSTRACT

A water-powered sump pump including a chamber with a water supply inlet, wastewater inlet and a discharge outlet, wherein a venturi is secured within the chamber, and an elbow joint, including a wastewater exit portion and a wastewater entrance portions. This elbow joint is rotationally securable to the wastewater inlet of the chamber to permit securing of the water-powered sump pump in any desired orientation in relation to the sump. In one embodiment the wastewater inlet includes a cylindrical ingress portion with an upwardly facing ridge around a circumference thereof. The securing system of the elbow joint includes tabs on an inner surface of the exit portion of the elbow, each tab containing an inwardly extending rib which rib extends beyond the upwardly facing ridge on the ingress portion of the wastewater inlet when the elbow joint is secured onto the wastewater inlet.

20 Claims, 11 Drawing Sheets

(56) References Cited

U.S. PATENT DOCUMENTS

| | | | | |
|---|---|---|---|---|
| 3,963,376 | A | * | 6/1976 | Miskin ............... F04B 49/04 417/40 |
| 4,036,513 | A | * | 7/1977 | Loftus ............... F16L 47/12 285/236 |
| 4,422,829 | A | | 12/1983 | Buchanan |
| 4,451,069 | A | * | 5/1984 | Melone ............... F16L 37/0842 285/315 |
| 4,482,299 | A | | 11/1984 | Eulass |
| 4,552,512 | A | | 11/1985 | Gallup et al. |
| 4,673,200 | A | * | 6/1987 | Miyauchi ............... B60N 2/665 285/319 |
| 4,963,073 | A | | 10/1990 | Tash et al. |
| 5,302,088 | A | | 4/1994 | Gronski et al. |
| 5,613,835 | A | | 3/1997 | Tyner |
| 5,984,378 | A | * | 11/1999 | Ostrander ............ F16L 37/0985 285/319 |
| 6,527,518 | B2 | | 3/2003 | Ostrowski |
| 8,500,412 | B2 | | 8/2013 | Williams et al. |
| 8,956,126 | B2 | | 2/2015 | Fleischmann et al. |
| 9,200,630 | B1 | | 12/2015 | Huff et al. |
| 9,803,656 | B2 | | 10/2017 | Aspen et al. |
| 2014/0079468 | A1 | * | 3/2014 | Jensen ............... F04F 5/46 403/188 |
| 2014/0161629 | A1 | * | 6/2014 | Fleischmann ............ F04B 17/00 417/36 |
| 2016/0093408 | A1 | * | 3/2016 | Watanabe ................. F04F 5/54 376/370 |
| 2017/0321726 | A1 | * | 11/2017 | Lane ....................... F16B 2/185 |

OTHER PUBLICATIONS

"Basepump EZ and PRO with backflow preventer and installation parts." by Base Products Corporation (2018) https://www.basepump.com/products/basepump/basepumppro/.

"Hydropump RH1400 Battery Backup Sump Pump" by Base Products Corporation (2018) https://www.basepump.com/products/rh1400/.

"SUMPJET® Water Powered Back-Up Pump" flyer by LibertyPumps® (2017).

"Installing Water Commander™ Water-Powered Backup Sump Pump" by Tane Corporation (2015) http://www.tanecorp.com/Water_Commander_backup_sump_pump_installation_considerations.html.

MAX HOME GUARD® Model 503 Water Powered Emergency Backup Sump Pump System Preinstallation Checklist.

* cited by examiner

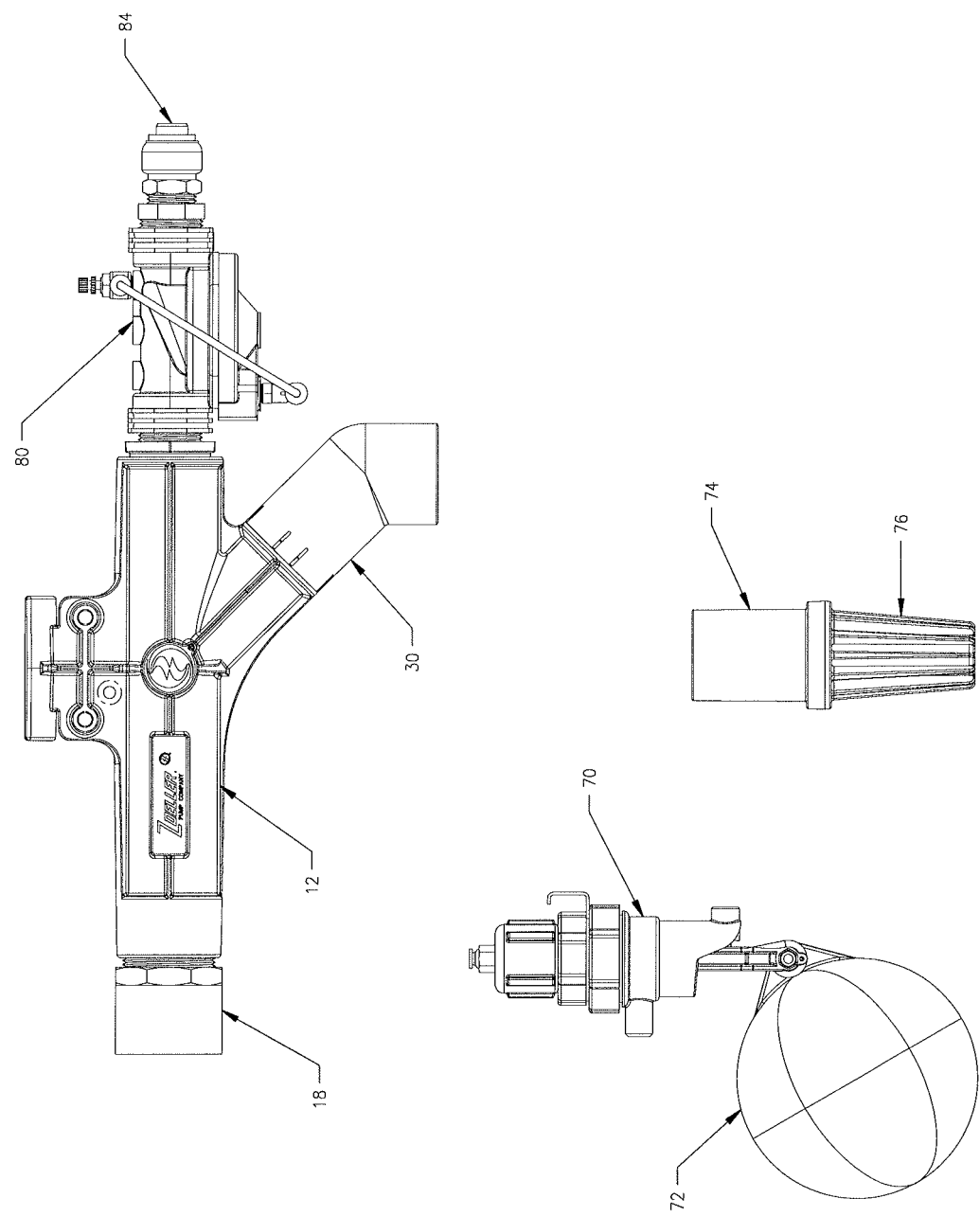

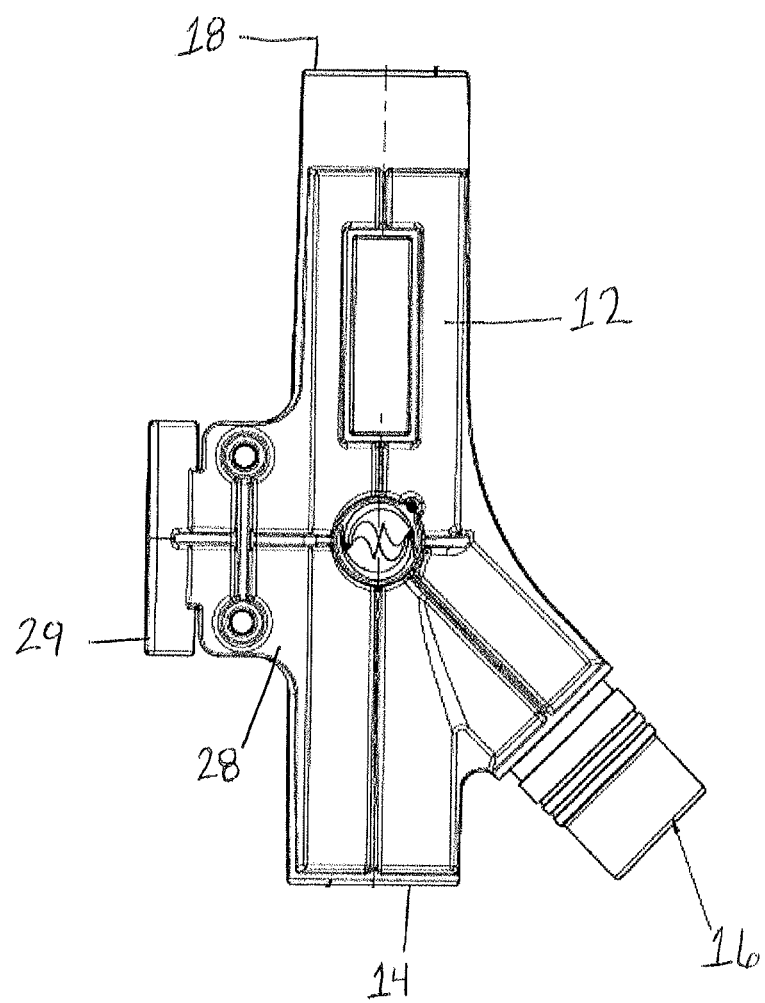

WATER-POWERED SUMP PUMP

CROSS REFERENCE TO RELATED APPLICATION

This Application claims priority from provisional application Ser. No. 62/796,268, filed Jan. 24, 2019.

BACKGROUND OF INVENTION

The present invention relates to a system that automatically removes wastewater from a sump by using a water source as the force used to evacuate the wastewater. This system is commonly referred to as a water-powered sump pump. Such a system may be used in conjunction with a standard electric sump pump or independently. Its use generally occurs when electric power to an electric sump pump is lost.

Sump pumps are utilized for many applications which may be of long or short-term duration. Currently, there are many devices that automatically pump wastewater out of a sump in the event that the electricity used to run an electric sump pump is lost, or if a primary sump pump experiences electrical or mechanical failure. One such system uses a back-up DC powered auxiliary sump pump. However, such a system requires a back-up battery system to provide power to the auxiliary sump pump.

An alternative system to the back-up DC powered sump pump is a water-powered sump pump, which depends only on the availability of a source of running water to operate the water-powered sump pump. Current water-powered sump pumps are rather limited in their usefulness as they are designed for placement at a fixed location within or associated with the sump.

In general, water-powered sump pumps, which can be used as a back-up sump pump, operate by use of a venturi effect. Thus, water flows into a venturi, that is secured within the body of a water-powered sump pump, where a restriction or narrowing at the neck of the venturi causes an increase in the water's velocity and a decrease in water pressure. This negative pressure creates suction that draws wastewater up through piping from a sump basin into the water-powered sump pump through the venturi and out a discharge outlet of the water-powered sump pump.

Notwithstanding the availability of several water-powered sump pumps, existing systems cannot easily be installed in all physical locations. For example, conventional water-powered sump pumps systems are designed for placement in only a single fixed location in association with the sump, usually attached to discharge piping that is used with the electric sump pump.

One object of the disclosure is a new and improved water-powered sump pump, which is rotatably securable to a wastewater inlet of the sump pump, which rotatability permits the water-powered sump pump to be used in various locations and in various positions in relation to a sump, for example, in a vertical or horizontal position in relation to the sump. Such a rotatable, water-powered sump pump permits installation at any convenient location in association with the sump.

BRIEF DESCRIPTION OF THE DRAWINGS

FIG. 3 is a side, exploded view of the water-powered sump pump of FIG. 2.

FIG. 4A is a side view of a chamber of the water-powered sump pump of FIG. 2.

DESCRIPTION OF A PREFERRED EMBODIMENT OF THE INVENTION

Figure 1:
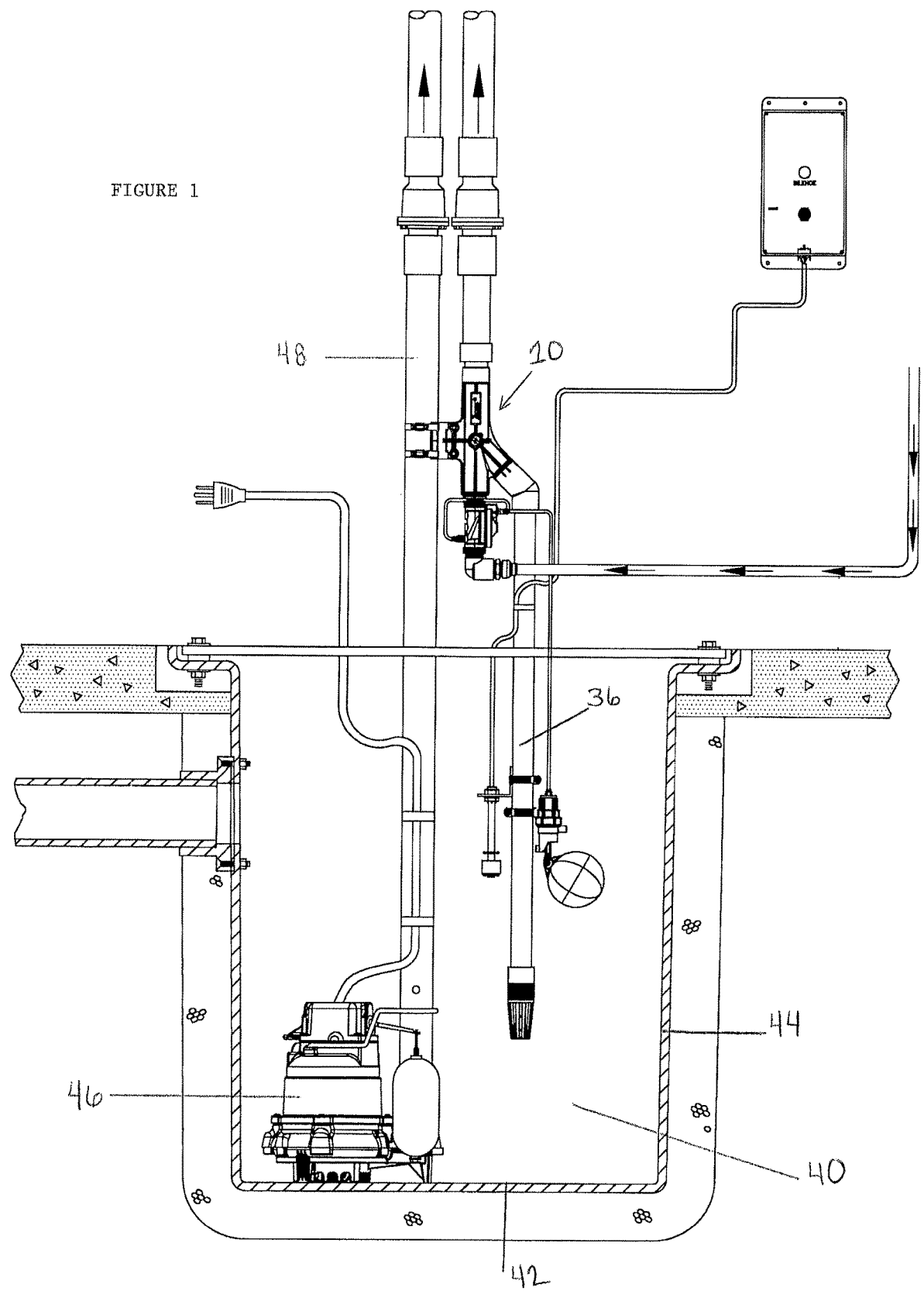
FIG. 1 is a side view of a water-powered sump pump installed with a conventional, electric sump pump within a sump, wherein the water-powered sump pump is attached vertically to discharge piping, wherein an alarm system is associated with the water-powered sump pump.
Figure 8:
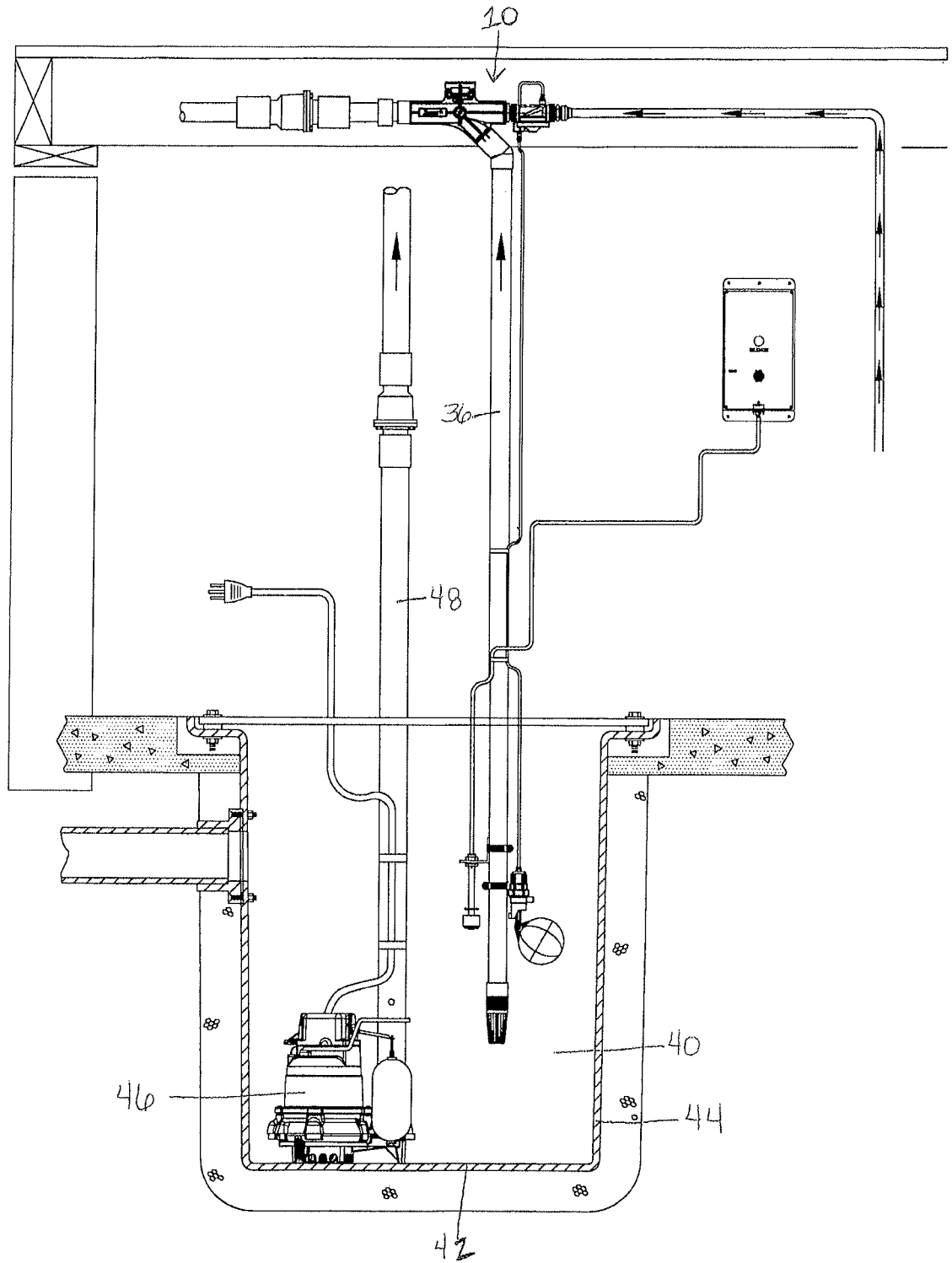
FIG. 8 is a side view of a water-powered sump pump utilized in combination with a conventional, electric sump pump within a sump, wherein the water-powered sump pump is installed horizontally to discharge piping, wherein an alarm system is associated with the water-powered sump pump.

With reference to the drawings, and in particular to FIGS. 1 and 8 thereof, there is disclosed a water-powered sump pump (10), that is securable in various alternative positions, such as vertically or horizontally, in relation to a sump, for use in the discharge of wastewater from that sump.

In one embodiment, as best shown in FIGS. 2, 3 and 4A-D, the water-powered sump pump (10) includes a chamber (12), with a water supply inlet (14), wastewater inlet (16), and a discharge outlet (18). Secured within the chamber is a venturi (20). Water, for example from a municipal water supply, flows through the water supply inlet into the venturi of the water-powered sump pump where a restriction or narrowing of the neck of the venturi causes an increase in the water's velocity and a decrease in water pressure, thereby creating a suction force that draws wastewater from the wastewater inlet and mixes it with the water from the water supply inlet for discharge through the discharge outlet.

Figure 2:
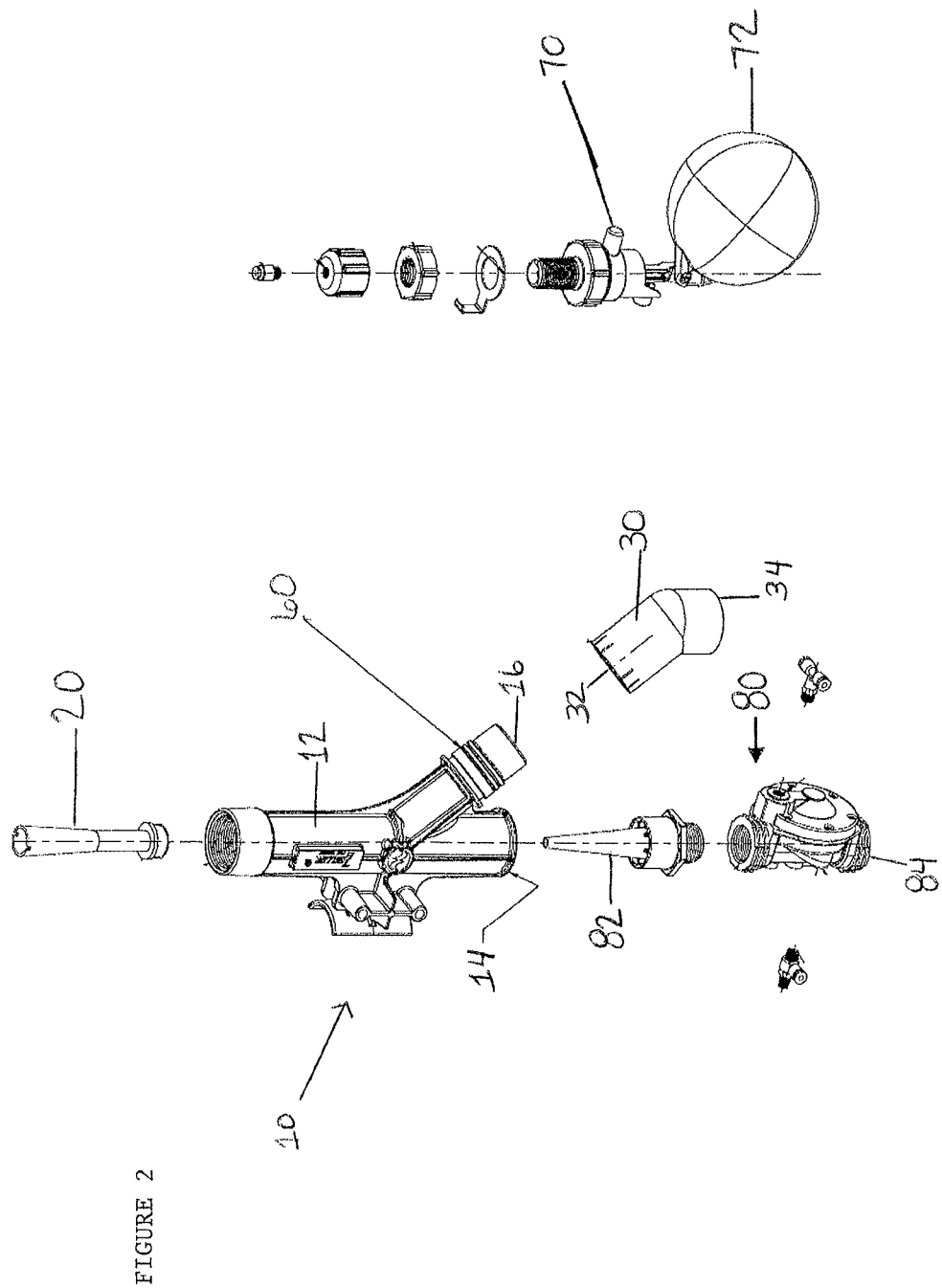
FIG. 2 is a perspective, exploded view of the water-powered sump pump for discharging wastewater that is shown in FIG. 1.
Figure 4B:
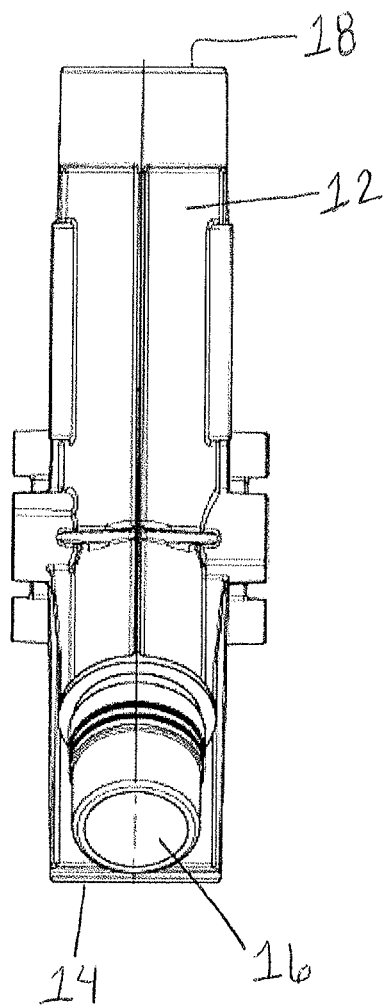
FIG. 4B is a bottom view of the chamber of the water-powered sump pump of FIG. 2.
Figure 4C:
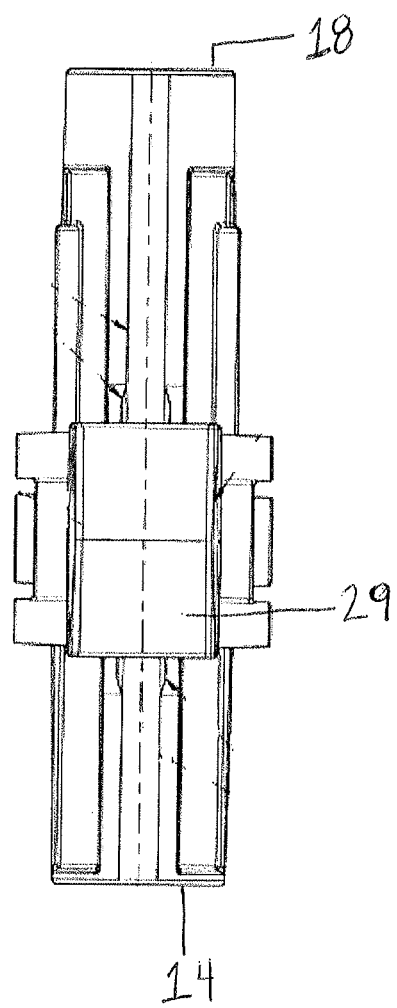
FIG. 4C is a top view of the chamber of the water-powered sump pump of FIG. 2.
Figure 4D:
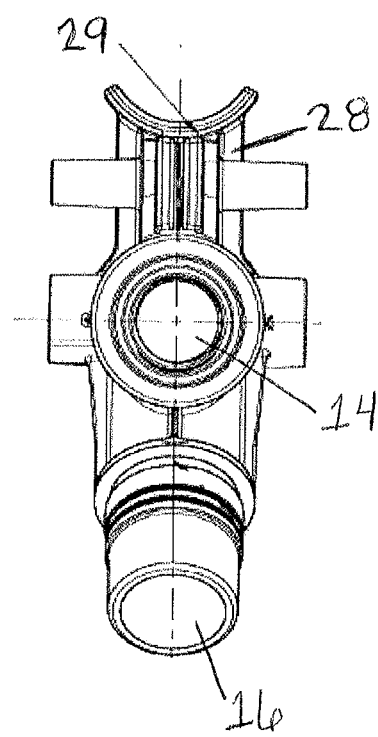
FIG. 4D is an end view of the chamber of the water-powered sump pump of FIG. 2.
Figure 5A:
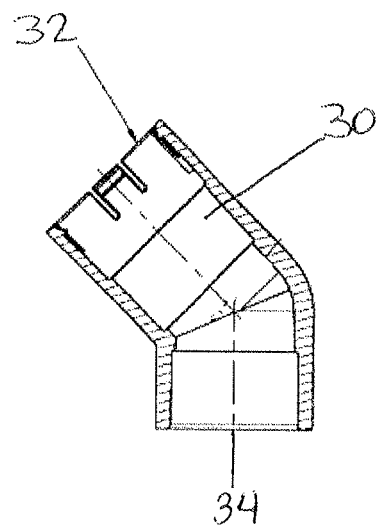
FIG. 5A is a side, cutaway view of an elbow joint containing a wastewater exit portion and wastewater entrance portion, which is rotatably securable to a wastewater inlet of the water-powered sump pump of FIG. 2.
Figure 5B:
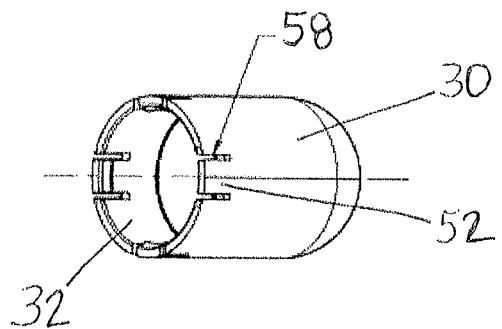
FIG. 5B is a top view of the elbow joint of FIG. 5A.

Secured onto the wastewater inlet is an elbow joint (30), as shown in FIGS. 2, 5A and 5B, which contains a wastewater exit portion (32) and a wastewater entrance portion (34). This elbow joint is rotatably securable to the wastewater inlet (16) of the chamber (12) and is also securable to any conventional support structure, preferably piping (36), for receipt of wastewater from a sump (40), as shown in FIGS. 1 and 8.

As shown in FIGS. 1 and 8, the sump (40) has a sump bottom (42) and sides thereof (44) within which is placed a conventional electric sump pump (46), which also, or alternatively, may include a battery-powered back-up pump (not shown). The conventional electric sump pump has discharge piping (48) to discharge wastewater fluid from the sump.

The sump pump is electrically powered and may be activated by various water level sensors, such as, for example, a float system.

The water-powered sump pump (10) of this embodiment of the invention may be secured to this piping which is an element of this electrically powered sump pump system that is present within the sump.

The particular structure chosen of this water powered sump pump permits securing of that water-powered sump pump, particularly to available piping, in any desired orientation in relation to the sump, including specifically in a vertical or horizontal orientation.

Figure 6:
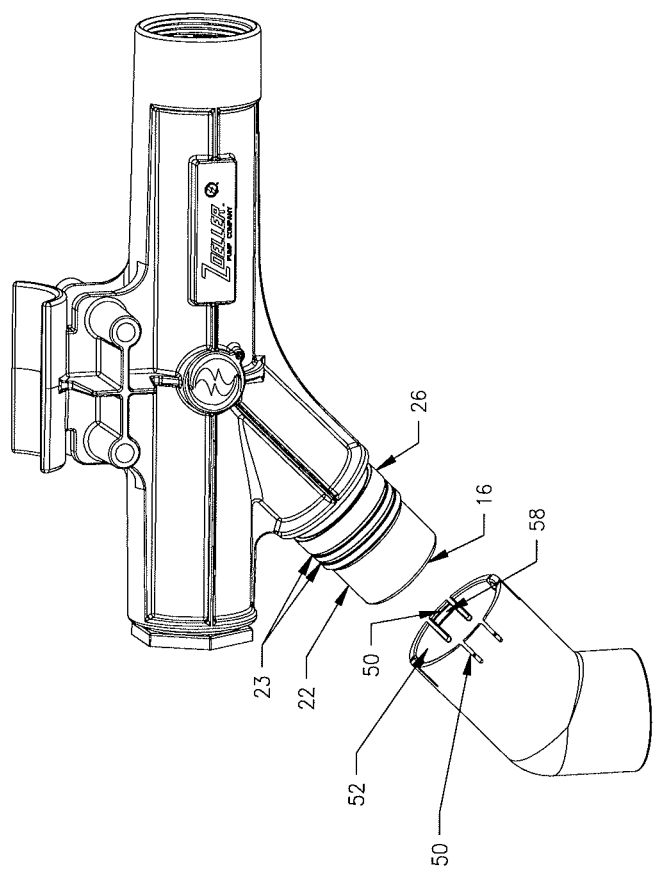
FIG. 6 is a side, perspective view of a portion of the elbow joint of FIGS. 5A and 5B in association with a water inlet portion of the water-powered sump pump of FIG. 2.
Figure 7:
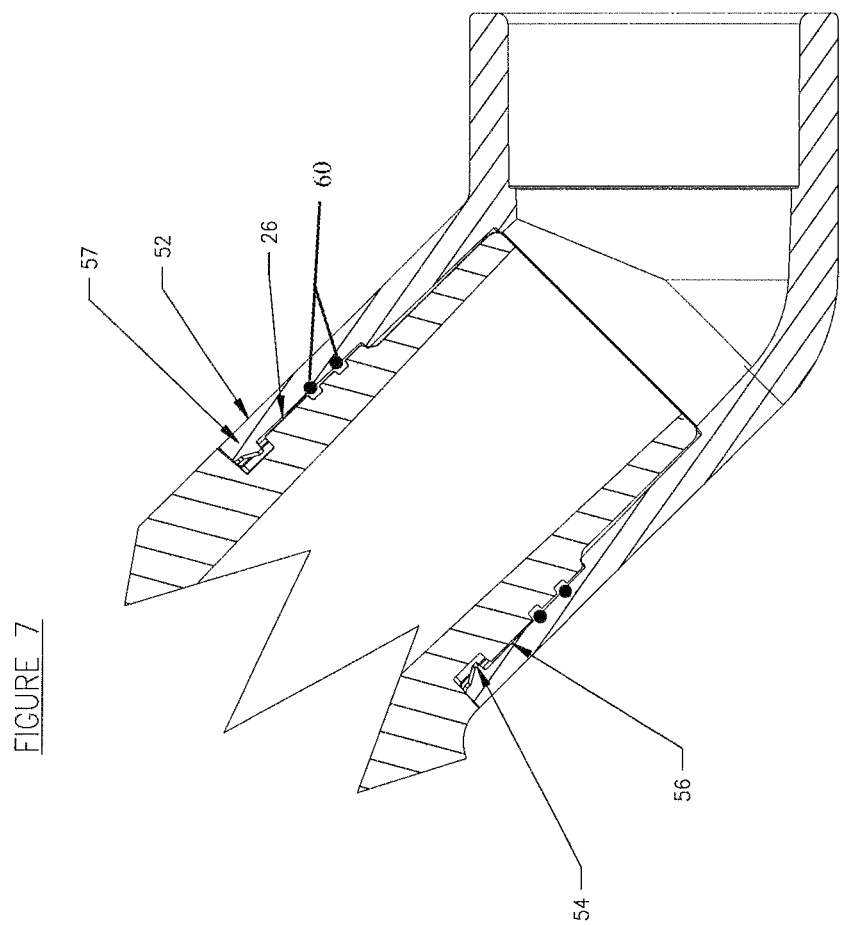
FIG. 7 is a side, cutaway view of an end portion of the elbow joint of FIG. 5A joined onto a water inlet of the water-powered sump pump of FIG. 2.

The wastewater inlet (16) of the chamber, in one embodiment as shown in FIG. 6, includes a cylindrical ingress portion (22) with one or more grooves (23) extending around a circumference of an outer surface (24) of this cylindrical ingress portion. There is also an upwardly facing ridge (26) around a circumference of the ingress portion of the wastewater inlet.

In this embodiment the elbow joint (30) includes a securing system (50) for rotationally securing the elbow joint to the wastewater inlet of the chamber. As shown in FIGS. 4A-4D, 6 and 7, the securing system of the elbow joint includes tabs (52) containing inset elements (54) that extend inward from an end (57) of the exit portion of the elbow joint on an inner surface (56) of the exit portion of the elbow joint. These inset elements extend over and beyond the upwardly facing ridge (26) of the ingress portion of the wastewater inlet when the elbow joint is secured onto the wastewater inlet. The sides (58) of the tabs (52) are preferably notched into the exit portion of the elbow joint to form the tabs, as shown in FIGS. 5A and 5B. In this embodiment, o-rings (60) extend into the grooves (23) in the outer surface of the ingress portion of the wastewater inlet when the elbow joint is secured onto the wastewater inlet.

By the various structure and cooperative elements described above of the elbow joint and the wastewater inlet of the chamber, the elbow joint is capable of rotating 360° about the wastewater inlet while still maintaining water tight security to prevent leakage around the elbow joint.

In one embodiment the wastewater inlet portion of the elbow joint is secured to a floating valve assembly (70), as shown in FIGS. 2 and 3. This floating valve assembly includes a float 72, which is utilized to turn on the water-powered sump pump when the level of wastewater within the sump reaches a predetermined level.

In addition, and preferably, a foot valve (74) with screen (76) is secured to the inlet piping, as shown in FIGS. 1 and 3. The screen filters the wastewater prior to its entrance into the piping of the water-powered sump pump.

Preferably, a diaphragm valve (80) is secured to a nozzle (82) which is secured to the water supply inlet of the chamber, as shown in FIGS. 2 and 3. Attached to the diaphragm valve is the inlet (84) for water from the conventional water source, such as a municipal water supply.

FIG. 1 shows one method of installation of the water-powered sump pump in a vertical arrangement, wherein it is secured to piping that is associated with the discharge pipe from the electric primary sump pump, that is present in the base of the sump.

As an alternative to securing of the water-powered sump pump with a vertical orientation, as shown in FIG. 1, the water-powered sump pump can be secured in any other orientations, such as for example, horizontally, as shown in FIG. 8. Alternatively, because the elbow joint is rotatable in a full 360° rotation around the wastewater inlet of the chamber of the water-powered sump pump, any orientation of the water-powered sump pump can be utilized relative to the position of the sump. This provides great adaptability for use of the water-powered sump pump in association with any type or location of sump.

In one embodiment for securing the water-powered sump pump to piping, it includes a mounting element (28) which is an element of the chamber, as shown in FIG. 4A-D. In one embodiment, the mounting element for mounting the water-powered sump pump to a support includes a cradle (29) with an arc of about 15 to 120°, which cradle is secured to an outer surface of the chamber by conventional securing system or by molding. Other structures may be used instead of this cradle for securing the chamber to support structures associated with a sump, as would be well known to a person skilled in the art. Other alternative securing systems can be used that are well known to a skilled person.

As an additional, or alternative feature, an alarm system can be utilized in association with the water-powered sump pump. Conventionally, the alarm is activated when wastewater in the sump reaches a predetermined level. Other conventional features may be present within this system, as shown in FIGS. 1 and 8, which are generally associated with the operation of the primary electric sump pump.

The foregoing is considered illustrative only of the principles of disclosure. Further, modifications and changes may readily occur to those skilled in the art in this disclosure. This disclosure is not intended to limit the disclosure of the exact construction and operation shown and described. Accordingly, suitable modifications of equivalence may be resorted to and are within the scope of the disclosure.

List of Components
10-Water-powered sump pump
12-Chamber
14-Water inlet
16-Wastewater inlet
18-Discharge outlet
20-Venturi
22-cylindrical ingress portion
23-grooves
24-outer surface
26-upwardly facing ridge
28- mounting element
29-cradle
30-Rotatable elbow joint
32-Wastewater exit portion
34-Wastewater entrance portion
36-piping
40-sump
42-sump bottom
44-sides of 40
46-electric sump pump
48-discharge piping
50-securing system
52-tabs
54-inset elements
56-an inner surface
57-end
58-sides
60-o-rings
70-floating valve assembly
72-Float
74-Foot valve
76-screen
80-diaphragm
82-nozzle
84-inlet

The invention claimed is:

1. A water-powered sump pump comprising
a chamber with a water supply inlet, a wastewater inlet, and a discharge outlet, wherein the water supply inlet forms an angle with the wastewater inlet;
a venturi secured within the chamber; and
a fixed angle elbow joint comprising a wastewater exit portion and a wastewater entrance portion, which fixed angle elbow joint is rotatably secured to the wastewater inlet of the chamber;
wherein the wastewater inlet of the chamber comprises a cylindrical ingress portion,
wherein the fixed angle elbow joint further comprises a securing system for rotationally securing the fixed angle elbow joint to the wastewater inlet,
wherein the fixed angle elbow joint is rotatable 360° around the wastewater inlet, and
wherein an inside angle between the wastewater inlet and the water supply inlet of the chamber, as they enter the chamber, is supplementary to an inside angle of the fixed angle elbow joint.

2. The water-powered sump pump of claim 1 wherein the securing system comprises an upwardly facing ridge around the circumference of the cylindrical ingress portion of the wastewater inlet of the chamber.

3. The water-powered sump pump of claim 2 wherein the securing system further comprises tabs on an inner surface of the exit portion of the fixed angle elbow joint, each tab containing an inwardly extending inset element, which inset element extends beyond the upwardly facing ridge on the cylindrical ingress portion of the wastewater inlet when the fixed angle elbow joint is secured onto the wastewater inlet.

4. The water-powered sump pump of claim 3 wherein the exit portion of the fixed angle elbow joint further comprises inset cuts extending inward from an end of the exit portion of the fixed angle elbow joint, wherein the cuts form sides of the tabs.

5. The water-powered sump pump of claim 1 wherein an outer surface of the cylindrical ingress portion comprises one or more grooves extending around a circumference of an outer surface of the cylindrical ingress portion.

6. The water-powered sump pump of claim 5 wherein an inner surface of the exit portion of the fixed angle elbow joint comprises one or more o-rings which extend into the grooves in the outer surface of the cylindrical ingress portion of the wastewater inlet when the fixed angle elbow joint is secured onto the wastewater inlet.

7. The water-powered sump pump of claim 1 further comprising a mounting element for mounting to a support comprising a cradle with an arc of 15 to 120 degrees, which cradle is secured to an outer surface of the chamber.

8. The water-powered sump pump of claim 1 further comprising a float system.

9. The water-powered sump pump of claim 1 further comprising a filter system secured to piping which piping is secured to the fixed angle elbow joint.

10. A water-powered sump pump comprising
a chamber with a water supply inlet, a wastewater inlet, and a discharge outlet, wherein the water supply inlet forms an angle with the wastewater inlet;
a venturi secured within the chamber;
a fixed angle elbow joint comprising a wastewater exit portion and a wastewater entrance portion, which fixed angle elbow joint is rotatably secured to the wastewater inlet of the chamber;
wherein the wastewater inlet of the chamber comprises a cylindrical ingress portion;
wherein the fixed angle elbow joint further comprises a securing system for rotationally securing the fixed angle elbow joint to the wastewater inlet;
wherein the securing system comprises an upwardly facing ridge around at least a portion of a circumference of the cylindrical ingress portion of the wastewater inlet of the chamber;
the securing system further comprises tabs on an inner surface of the exit portion of the fixed angle elbow joint, each tab containing an inwardly extending inset element, which inset element extends beyond the upwardly facing ridge on the cylindrical ingress portion of the wastewater inlet when the fixed angle elbow joint is secured onto the wastewater inlet,
wherein an outer surface of the cylindrical ingress portion comprises one or more grooves extending around a circumference of an outer surface of the cylindrical ingress portion,
wherein the fixed angle elbow joint is rotatable 360° around the wastewater inlet, and
wherein an inside angle between the wastewater inlet and the water supply inlet of the chamber, as they enter the chamber, is supplementary to an inside angle of the fixed angle elbow joint.

11. The water-powered sump pump of claim 10 wherein an inner surface of the exit portion of the fixed angle elbow joint comprises one or more o-rings which extend into the grooves in the outer surface of the cylindrical ingress portion of the wastewater inlet when the fixed angle elbow joint is secured onto the wastewater inlet.

12. The water-powered sump pump of claim 10 wherein the exit portion of the fixed angle elbow joint further comprises inset cuts extending inward from an end of the exit portion of the fixed angle elbow joint, wherein the cuts form sides of the tabs.

13. The water-powered sump pump of claim 10 further comprising a mounting element for mounting to a support comprising a cradle with an arc of 15 to 120 degrees, which cradle is secured to an outer surface of the chamber.

14. The water-powered sump pump of claim 10 further comprising a float system.

15. The water-powered sump pump of claim 10 further comprising a filter system secured to piping which piping is secured to the fixed angle elbow joint.

16. The water-powered sump pump of claim 10, wherein the wastewater inlet, water supply inlet, and fixed angle elbow joint are in the same plane.

17. A water-powered sump pump comprising
a chamber including a water supply inlet, a wastewater inlet, a discharge outlet, and a mounting element;
a venturi secured within the chamber; and
a fixed angle elbow joint comprising a wastewater exit portion and a wastewater entrance portion, which fixed angle elbow joint is rotatably secured to the wastewater inlet of the chamber;
wherein the mounting element for mounting the sump pump to a support is a molded component of the chamber and comprises a cradle with an arc of 15 to 120 degrees, which cradle is secured to and forms a tangent with an outer surface of the chamber, wherein the arc of the cradle faces away from a surface of the chamber,
wherein the wastewater inlet of the chamber comprises a cylindrical ingress portion,
wherein the fixed angle elbow joint further comprises a securing system for rotationally securing the fixed angle elbow joint to the wastewater inlet, and wherein the fixed angle elbow joint is rotatable 360° around the wastewater inlet.

18. The water-powered sump pump of claim 17 wherein the securing system comprises an upwardly facing ridge around a circumference of the cylindrical ingress portion of the wastewater inlet of the chamber.

19. The water-powered sump pump of claim 18 wherein the securing system further comprises tabs on an inner surface of the exit portion of the fixed angle elbow joint, each tab containing an inwardly extending inset element, which inset element extends beyond the upwardly facing ridge on the cylindrical ingress portion of the wastewater inlet when the fixed angle elbow joint is secured onto the wastewater inlet.

20. The water-powered sump pump of claim 17 wherein the exit portion of the fixed angle elbow joint further comprises inset cuts extending inward from an end of the exit portion of the fixed angle elbow joint, wherein the cuts form sides of the tabs.

\* \* \* \* \*